United States Patent [19]

Ishii et al.

[11] Patent Number: 5,141,082
[45] Date of Patent: Aug. 25, 1992

[54] LINEAR MOTOR ELEVATOR SYSTEM

[76] Inventors: Toshiaki Ishii; Hiroyuki Ikejima; Hirosi Yosikawa; Kazuhiko Sugita, all c/o Mitsubishi Denki Kabushiki Kaisha Inazawa Seisakusho 1, Hishimachi, Inazawa-shi, Aichi-ken; Shigekazu Sakabe; Hidehiko Sugimoto, both c/o Mitsubishi Denki Kabushiki Kaisha Sangyo System Kenkyusho, 1-1, Tsukaguchihonmachi 8-chome, Amagasaki-shi, Hyogo-ken; Toshiaki Maehara; Takesi Kisimoto, both c/o Mitsubishi Denki Kabushiki Kaisha Nagoya Seisakusho, 1-14, Yadaminami 5-chome, Higashi-ku, Nagoya-shi, Aichi-ken, all of Japan

[21] Appl. No.: 712,102

[22] Filed: Jun. 7, 1991

[30] Foreign Application Priority Data

Jun. 11, 1990 [JP] Japan .................... 2-149842

[51] Int. Cl.⁵ ............................ B66B 9/04
[52] U.S. Cl. ........................ 187/110; 187/95; 187/112; 318/135
[58] Field of Search .......... 187/110, 112, 1 R; 318/135, 369; 104/290

[56] References Cited

U.S. PATENT DOCUMENTS

| | | | |
|---|---|---|---|
| 3,701,321 | 10/1972 | Lee | 104/290 |
| 3,802,349 | 4/1974 | Guimbal | 318/135 |
| 3,891,907 | 6/1975 | Lenzkes et al. | 318/369 |
| 4,402,386 | 9/1983 | Ficheux et al. | 187/112 |
| 4,570,753 | 2/1986 | Ohta | 187/1 R |
| 5,033,588 | 7/1991 | Nakai et al. | 187/85 |

Primary Examiner—A. D. Pellinen
Assistant Examiner—Lawrence E. Colbert

[57] ABSTRACT

A linear motor elevation system comprising an elongated magnetic induction member (21) mounted along the hoistway. The induction member (21) has a plurality of magnetic poles (21a) disposed at equal intervals along the hoistway so that they face toward the armature (27). An elevator car (4) or a counter weight has attached thereto a field magnet (26) disposed in a facing relationship with respect to the magnetic induction member (21) for generating magnetic poles in the induction member (21). The field magnet (26) comprises an iron core (23) having a U-shaped cross section including a central web portion on which a field winding 24 is wound and parallel flange portions extending from the web portion toward the magnetic induction member (21). An armature (27) comprising armature windings (25) wound on teeth formed in the magnetic induction member (21) is also disposed on the car (4) in a facing relationship with resepct to the magnetic induction member (21) for generating a progressive magnetic field acting on the magnetic induction member (21) to generate an electromagnetic drive force for moving the car (4) along the hoistway. The magnetic induction element (31) may have a guide surface which is in guiding engagement with guide rollers (41) mounted on the car (4) for guiding it along the hoistway.

15 Claims, 6 Drawing Sheets

LINEAR MOTOR ELEVATOR SYSTEM

BACKGROUND OF THE INVENTION

This invention relates to a linear motor elevator system in which a linear motor is used as a drive unit for driving an elevator car in a hoistway.

A linear motor elevator system having a linear motor drive unit is disclosed in Japanese Patent Laid-Open No. 57-121568.

Figure 10:
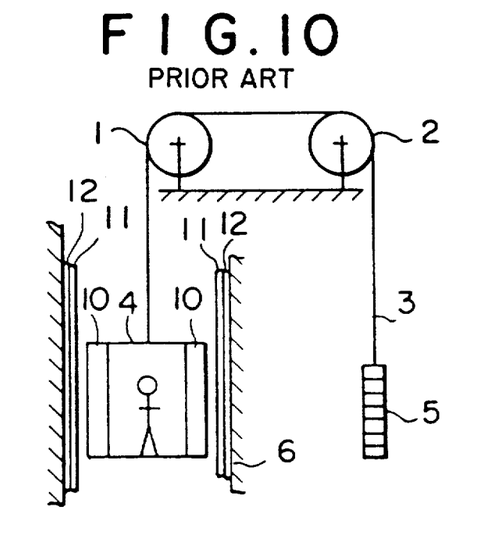
FIG. 10 is a schematic side view illustrating one example of a conventional linear motor elevator system.
Figure 11:
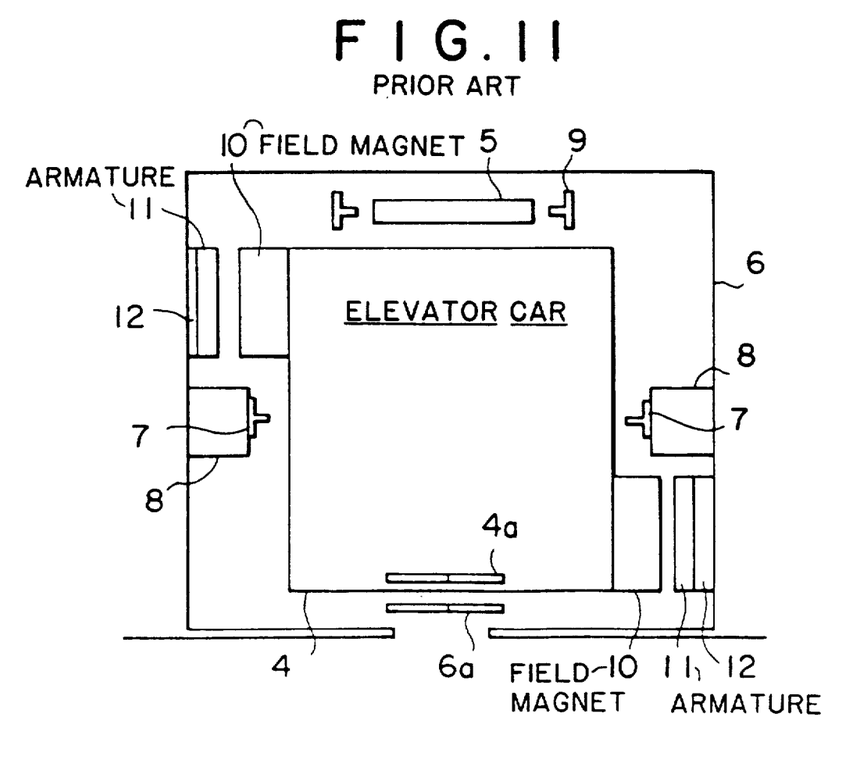
FIG. 11 is a schematic plan view of the conventional linear motor elevator system illustrated in FIG. 10.

FIG. 10 is a schematic side view of one example of a linear elevator system in which a linear synchronous motor (LSM) is used as a drive unit, and FIG. 11 is a schematic plan view of the elevator system illustrated in FIG. 10.

In FIGS. 10 and 11, a rope 3 extending around a first and a second sheaves 1 and 2 has connected at one end thereof an elevator car 4 and has connected at the other end a counter weight 5. The elevator car 4 and the counter weight 5 are both movable members disposed and movable within a hoistway 6. Within the hoistway 6, vertically extending car guide rails 7 are securely attached to an inner wall through rail brackets 8 so that unillustrated guide rollers mounted to the elevator car 4 is in guided engagement with the guide rails 7 and so that the elevator car 4 is vertically movably guided along the guide rails 7. Similar guide rails 9 for vertically movably guiding the counter weight 5 through guide rollers (not shown) on the counter weight 5 are securely attached to the inner wall of the hoistway 6.

The elevator car 4 is provided with a car door 4a, and in the corresponding position of the hoistway 6, a landing floor door 6a is provided.

The elevator car 4 also has mounted on side walls thereof field magnets 10. The inner wall of the hoistway 6 has mounted thereon armatures 11 each disposed in a facing relationship with respect to the field magnets 10 on the car 4. The armatures 11 are mounted through mounting brackets 12 to extend throughout the hoistway 6. The field magnets 10 and the armatures 11 together constitute a linear synchronous motor.

In the linear motor elevator system in which the conventional LSM as above-described is used, a vertical electromagnetic drive force which drives the elevator car 4 is generated by generating a progressive magnetic field acting on the field magnet 10 in the elongated vertical armature 11 by exciting the armature 11 in the hoistway 6. Accordingly, the armature 11 must have armature windings which extends over an entire length of the vertical hoistway and which therefore increases the manufacturing cost of the elevator system.

Figure 12:
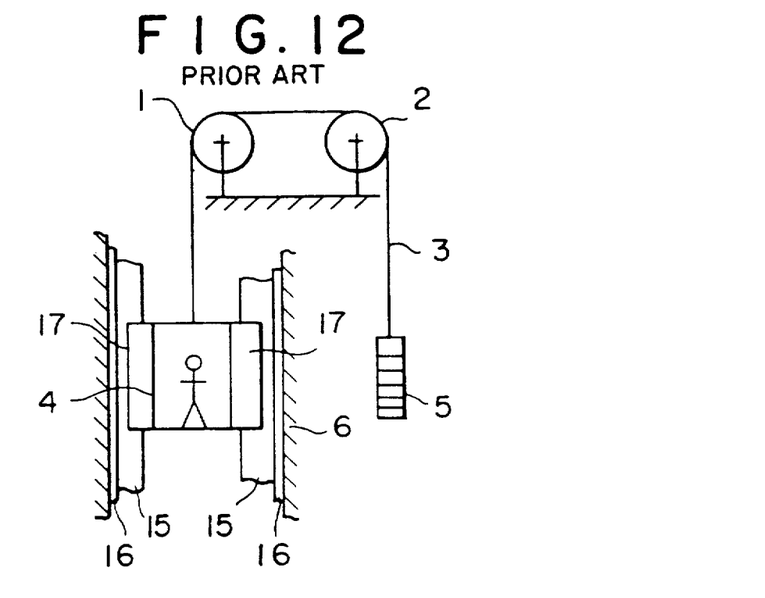
FIG. 12 is a schematic side view illustrating another example of a conventional linear motor elevator system.
Figure 13:
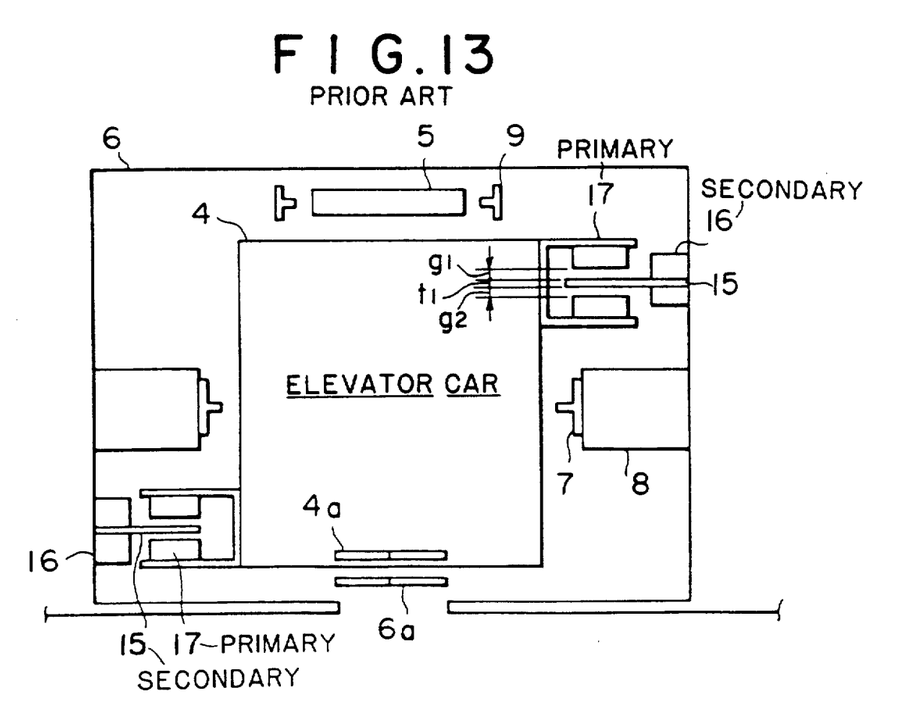
FIG. 13 is a schematic plan view of the conventional linear motor elevator system illustrated in FIG. 12.

FIG. 12 is a schematic side view of one example of a conventional linear motor elevator system employing a conventional linear induction motor (LIM) as a drive unit, and FIG. 13 is a schematic plan view illustrating the linear motor elevator system shown in FIG. 12.

In FIGS. 12 and 13, a plate-shaped secondary conductor 15 made of aluminum for example and vertically extending along the hoistway 6 is secured through a bracket 16 to inner side walls of the hoistway 6. The elevator car 4 has mounted on both sides thereof primary windings 17. It is seen that two primary windings 17 are used in pair on each side of the elevator car 4, in which two primary windings 17 are supported in an opposing relationship to each other with a space defined therebetween. The secondary conductor 15 having a thickness $t_1$ extends into the space between the primary windings 17 with gaps $g_1$ and $g_2$ defined on each side of the secondary conductor 15. The secondary conductor plate 15 and the primary windings 17 together constitute a linear induction motor (LIM). Although not illustrated, the electrical power to the primary windings 17 mounted on the elevator car 4 is supplied from an external power source through unillustrated travelling cables and/or sliding contact shoes.

When an a.c. power is supplied to the primary windings 17 thereby generating a magnetic field having magnetic fluxes that move as the time lapses, eddy currents are generated in the surfaces of the plate-shaped secondary conductor 15. Therefore, because of the electromagnetic interactions between the progressive magnetic field and the eddy currents, a thrust or a drive force which drives the elevator car 4 is generated in the linear induction motor.

In the linear induction motor elevator system as above described, the magnetic gap which is the sum of the gaps $g_1$ and $g_2$ and the thickness $t_1$ of the secondary plate conductor 15 is inevitably defined between the opposing primary windings 17, which causes the power factor of the linear induction motor to decrease, making the linear induction motor to be large sized.

SUMMARY OF THE INVENTION

Accordingly, an object of the present invention is to provide a linear motor elevator system free from the above discussed problems of the conventional linear motor elevator system.

Another object of the present invention is to provide a linear motor elevator system simple in structure.

Another object of the present invention is to provide a linear motor elevator system easily manufactured and installed.

A further object of the present invention is to provide a linear motor elevator system which is inexpensive.

A still further object of the present invention is to provide a linear motor elevator system improved in the power factor of the linear motor.

Another object of the present invention is to provide a linear motor elevator system improved in the linear motor structure.

With the above objects in view, the linear motor elevator system comprises a movable body such as an elevator car or a counter weight disposed within a hoistway and an elongated magnetic induction member installed within the hoistway and extending along the hoistway. The elevator system also comprises a field magnet disposed on the movable body in a facing relationship with respect to the magnetic induction member for generating magnetic poles in the magnetic induction member. An armature is disposed on the movable body in a facing relationship with respect to the magnetic induction member so that a progressive magnetic field acting on the magnetic induction member is generated to generate a drive force for moving the movable member along the hoistway.

The magnetic induction member may comprise an elongated magnetic plate extending along the hoistway and a plurality of magnetic poles disposed on the elongated plate at a substantially equal intervals along the hoistway, the magnetic poles facing toward the armature on the movable body.

The field magnet may comprise an iron core having a substantially U-shaped cross section including a central web portion and parallel flange portions extending from the web portion, the flange portions extending toward the magnetic induction member, and a field winding disposed on the web portion of of the iron core. The armature may comprise a magnetic iron core having a plurality of teeth arranged along the magnetic induction member and a plurality of armature windings wound on the teeth.

Alternatively, the linear motor elevator system of the present invention may comprises an elongated, rigid magnetic induction member extending along the hoistway and defining a guide surface for guiding the movable body therealong. A pair of field magnets are disposed on the movable body in a spaced, opposing relationship to each other for receiving the magnetic induction member therebetween, for generating magnetic poles in the magnetic induction member. Armatures are disposed on the field magnets in a facing relationship with respect to the magnetic induction member and generating progressive magnetic fields acting on the magnetic induction member to generate an electromagnetic drive force for moving the movable member along the hoistway. The movable body has mounted thereon a guide unit including a guide rollers which is in guided engagement with the guide surface on the magnetic induction element for guiding the movable body along the hoistway.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
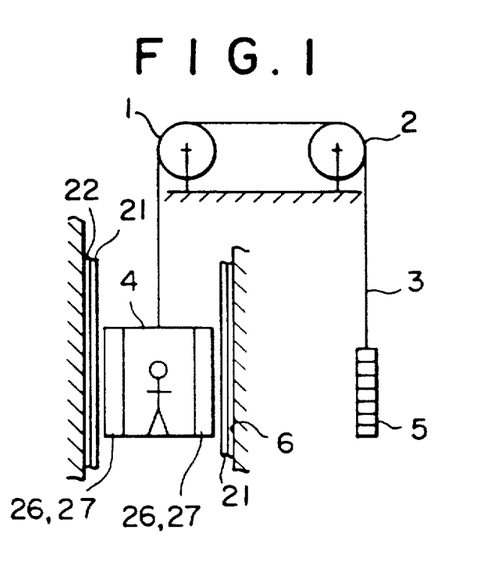
FIG. 1 is a schematic side view illustrating one embodiment of the linear motor elevator system of the present invention.
Figure 2:
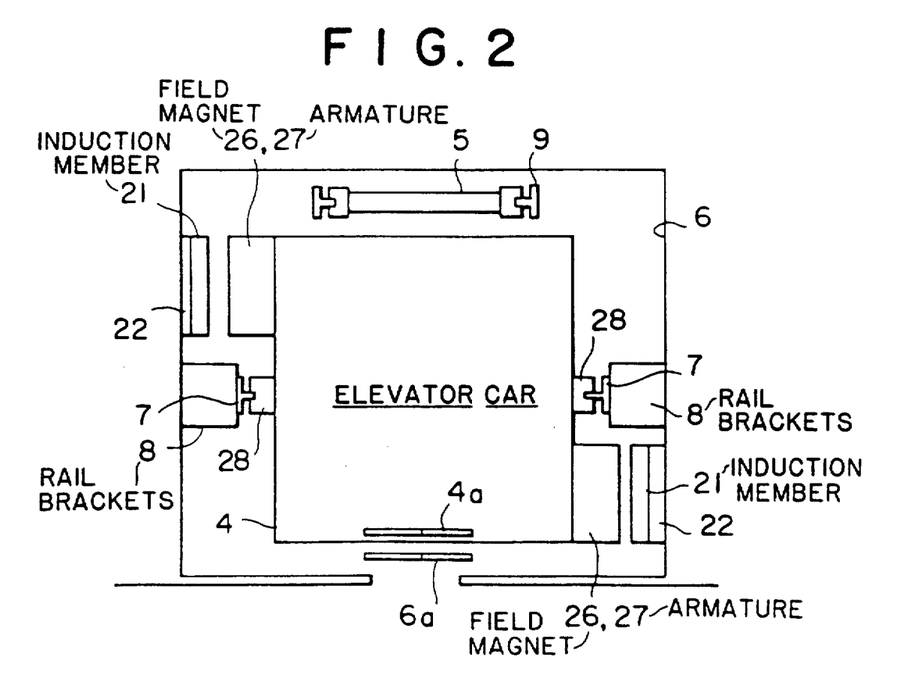
FIG. 2 is a schematic plan view of the linear motor elevator system illustrated in FIG. 1.
Figure 3:
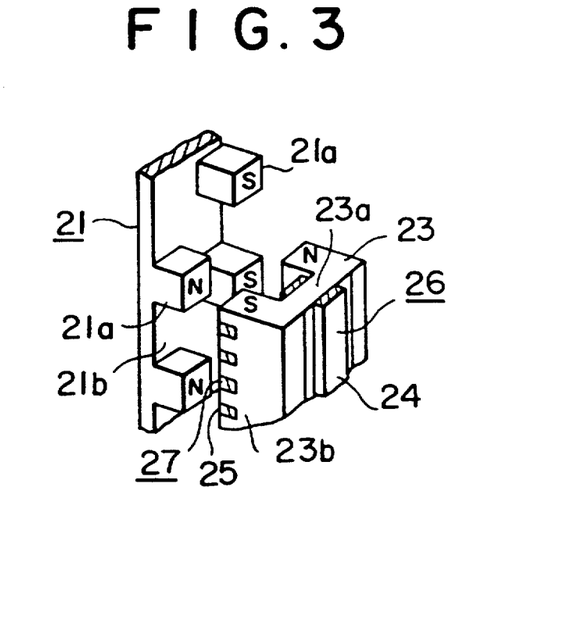
FIG. 3 is a perspective view illustrating one portion of linear motor.

FIGS. 1 to 3 illustrate one embodiment of the linear motor elevator system of the present invention. In the figures, a linear motor elevator system of the present invention comprises an elevator car 4 and a counter weight 5 disposed within the hoistway 6. The elevator car 4 and the counter weight 5 are connected through a rope 3 extending around two sheaves 1 and 2 mounted to the pent house of a building. The elevator car 4 is movably supported within the hoistway 6 through guide rollers 28 on the car 4 which are in guided engagement with guide rails 7 vertically supported on an inner wall of the hoistway 6 through rail brackets 8. The counter weight is also supported by guide rails 9 supported on the inner wall of the hoistway 6. It is also seen that the elevator car 4 has a car door 4a and the building has a landing floor door 6a.

The linear motor elevator system of the present invention also comprises an elongated magnetic induction member 21 mounted on each side inner wall of the hoist way 6 through a bracket 22. The magnetic induction members 21 are made of a magnetic material such as iron and extends vertically along and within the hoistway 6. As best illustrated in FIG. 3, the magnetic induction member 21 comprises an elongated magnetic plate 21b extending along the hoistway 6 and a plurality of magnetic poles 21a disposed on the elongated plate 21b at substantially equal intervals in two rows defined on two side edges of the magnetic plate 21b. It is seen that the magnetic poles 21a in one row on one side edge of the magnetic plate 21b are in a staggered relationship with respect to the magnetic poles 21a in the other row on the other side edge of the magnetic plate 21b. The magnetic poles 21a project from the magnetic plate 21b toward the elevator car 4.

The linear motor elevator system also comprises a field magnet 26 disposed on the elevator car 4 in a facing relationship with respect to the magnetic induction member 21 for generating magnetic poles in the magnetic induction member 21. As best seen from FIG. 3, the field magnet 26 comprises an iron core 23 having a substantially U-shaped cross section including a central web portion 23a and parallel flange portions 23b extending from the web portion 23a toward the magnetic induction member 21. The field magnet 26 also comprises a field winding 24 disposed on the web portion 23a of the iron core 23 for generating a d.c. magnetic field in the iron core 23.

The flange portion 23b of the iron core 23 has mounted thereon an armature 27 in a facing relationship with respect to the magnetic induction member 21. The armature 27 generates a progressive magnetic field travelling and acting on the magnetic induction member 21 to generate a magnetic drive force for moving the elevator care 4 along the hoistway 6. The armature 27 comprises a plurality of armature windings 25 wound on a plurality of teeth of the flange portion 23b of the magnetic iron core 23 and arranged along the magnetic induction member 21.

The above magnetic induction member 21, the field magnet 26 and the armature 27 together constitute an induction-type linear synchronous motor (ILSM) for generating an electromagnetic drive force. When the field winding 24 of the field magnet 26 is excited by a d.c. current, the field magnet 26 generates a d.c. magnetic field which generates N or S magnetic poles in the magnetic pole pieces 21a of the magnetic induction member 21. On the other hand, the armature windings 25 are a.c. excited, so that a progressive magnetic field in accordance with the frequency of the a.c. power source is generated in the armature 27. Therefore, the magnetic poles of the magnetic induction member 21 and the progressive magnetic field on the armature 27 interact between them and generate a magnetic thrust or drive force therebetween for moving the elevator car 4 within the hoistway 6 along the guide rails 7.

With the induction-type linear synchronous motor elevator system as above-described, it is not necessary to arrange windings over an entire range of travel of the elevator car 4 as was in the conventional linear synchronous motor elevator system. It is sufficient in the linear motor elevator system of the present invention to provide an iron plate-shaped induction member 21 throughout the hoistway 6, the elevator installation can be achieved easier and at less expense than in the conventional linear synchronous motor. Also, the linear motor can be kept small-sized because the power factor is not decreased as was in the conventional linear induction motor.

Figure 4:
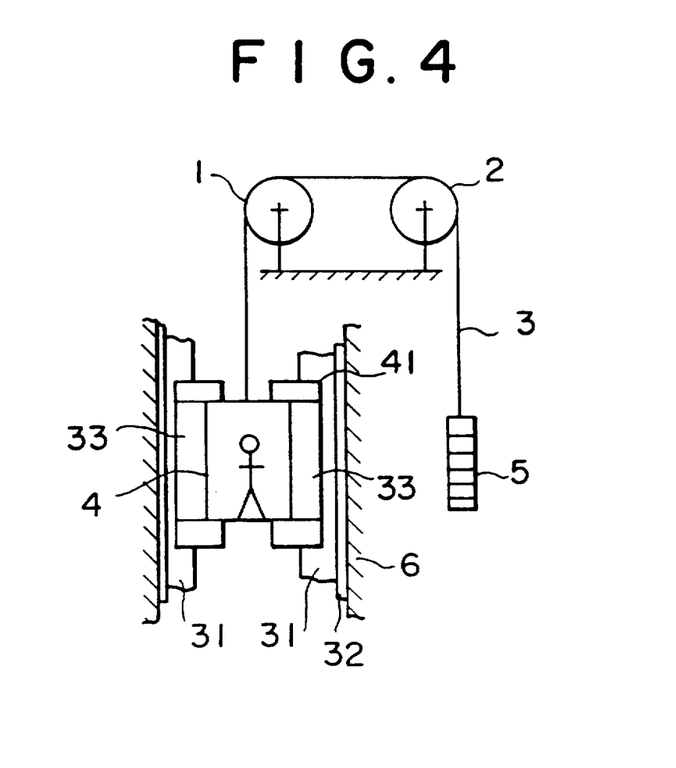
FIG. 4 is a schematic side view illustrating another embodiment of the linear motor elevator system of the present invention.
Figure 5:
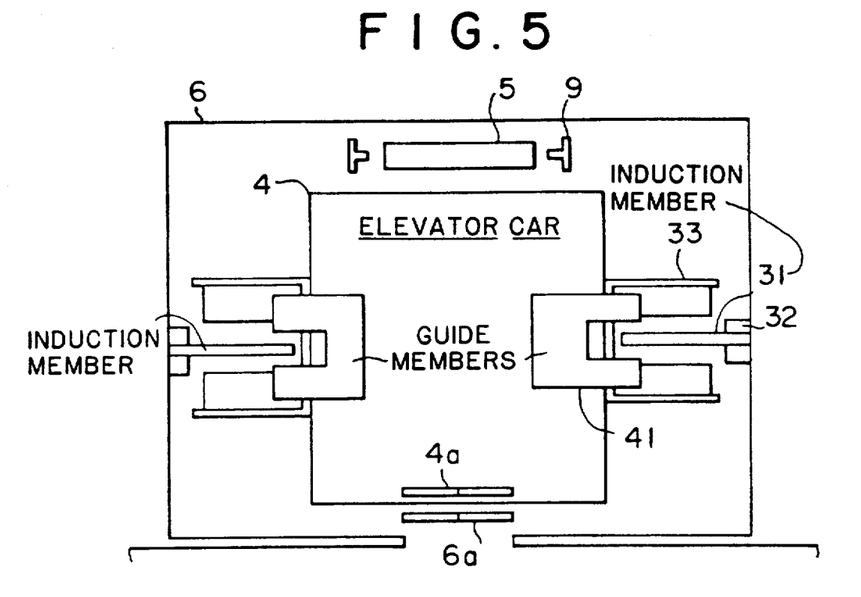
FIG. 5 is a schematic plan view of the linear motor elevator system illustrated in FIG. 4.
Figure 6:
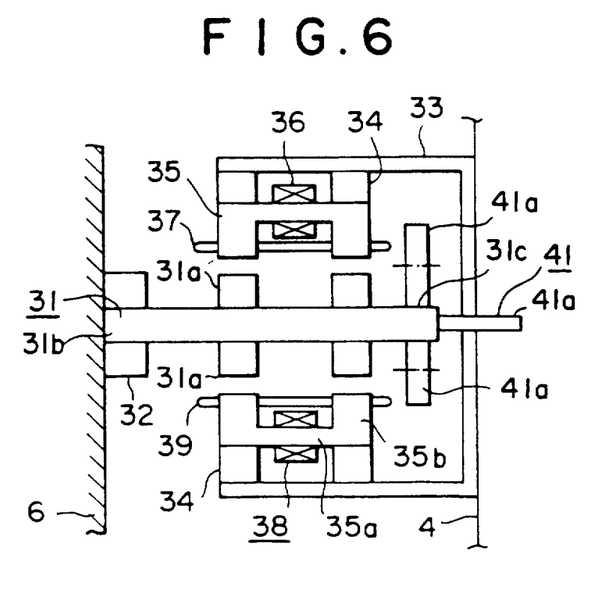
FIG. 6 is an enlarged view illustrating one portion of linear motor.

FIGS. 4 to 6 illustrate another embodiment of the linear motor elevator system of the present invention, in which the linear motor elevator system of the present invention comprises an elevator car 4 and a counter weight 5 disposed within the hoistway 6. The elevator car 4 and the counter weight 5 are connected through a rope 3 extending around two sheaves 1 and 2 mounted to the pent house of a building. The counter weight is supported by guide rails 9 supported on the inner wall of the hoistway 6. It is also seen that the elevator car 4 has a car door 4a and the building has a landing floor door 6a.

Figure 7:
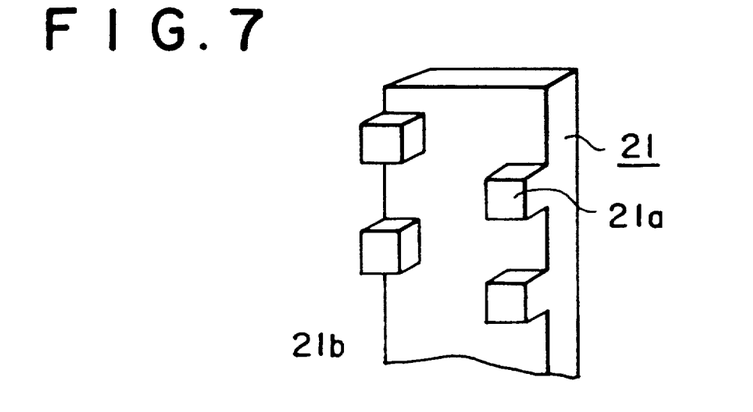
FIG. 7 is a perspective view illustrating one example of the magnetic induction member used in the linear motor elevator system of the present invention.

The linear motor elevator system of the present invention also comprises an elongated, rigid magnetic induction member 31 mounted within the hoistway on each side inner wall of the hoistway 6 through a bracket 32. As best seen in FIG. 6, the magnetic induction member 31 comprises a rigid elongated magnetic plate 31b made of a magnetic material such as iron and a plurality of magnetic pole pieces 31a disposed in rows on both sides of the magnetic plate 31b at substantially equal intervals therebetween along the magnetic plate 31b. The magnetic poles 31a on each side of the magnetic plate 31b may be arranged as illustrated in FIG. 7. The magnetic plate 31b has defined along a side edge thereof guide surfaces 31c for guiding the elevator car 4 therealong through a guide member 41 including three guide rollers 41a mounted to the car 4.

The elevator car 4 has securely mounted thereon a substantially U-shaped mounting bracket 33 on which a pair of field magnets 38 are mounted through non-magnetic brackets 34 in a spaced, opposing relationship to each other for receiving the magnetic induction member 31 therebetween. The field magnets 38 is in a facing relationship with respect to the magnetic induction member 31 from both sides thereof for generating magnetic poles in the magnetic induction member 31. Each of the field magnets 38 comprises an iron core 35 having a substantially U-shaped cross section including a central web portion 35a and parallel flange portions 35b extending from the web portion 35a toward the magnetic induction member 31. A field winding 36 is disposed on the web portion 35a of the iron core 35 for generating a magnetic field in the iron core 35.

The iron core 35 is also provided with armatures 39 in a facing relationship with respect to the magnetic induction member 31 for generating progressive magnetic fields acting on the magnetic induction member 31 to generate an electromagnetic drive force for moving the elevator car 4 along the hoistway. Each of the armatures 39 comprises a plurality of armature windings 37 wound on a plurality of teeth (not shown) arranged in the flange portion 35b of the magnetic induction member 31.

With this arrangement, the induction member 31, the field magnet 38 and the armature 39 together constitute an induction-type linear synchronous motor which generates an electromagnetic thrust for driving the elevator car 4 within the hoistway 6. Also, since the rigid magnetic induction member 31 has a guide surfaces 31c and also serves as a guide rail for the elevator car 4, the entire structure of the elevator system is simple and installation of the elevator system to the building is easy, resulting in a less expensive elevator system.

While the secondary conductor 15 of the conventional linear induction motor illustrated in FIG. 13 is made of aluminum, which makes it impossible to use the conductor 15 as a guide rail because of insufficient mechanical strength of aluminum, the magnetic induction member 31 of the induction-type linear synchronous motor of the present invention is only required to be made of a magnetic material, so that a mechanically strong material such as iron can be used and the induction member can also serve as a guide rail.

Further, in the embodiment illustrated in FIGS. 4 to 6, the magnetic induction member 31 is positioned between two opposing field magnets 38 and the armatures 39 which exert substantially equal electromagnetic forces on the induction member 31 from both sides, so that the resultant transverse force acting on the magnetic induction member 31 is relatively small, enabling the structure of the magnetic induction member 31 and the mounting brackets 32 to be simple and compact and less heavy.

Figure 8:
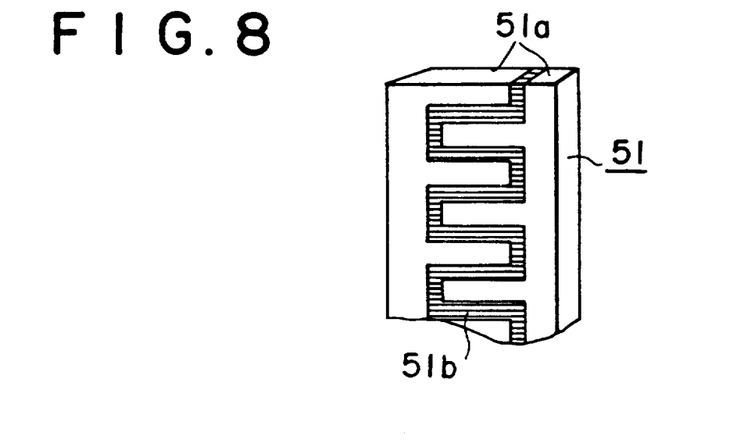
FIG. 8 is a perspective view illustrating another example of the magnetic induction member used in the present invention.
Figure 9:
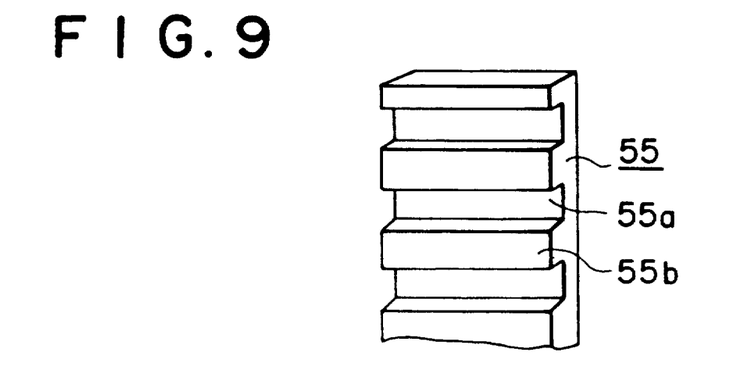
FIG. 9 is a perspective view illustrating another example of the magnetic induction member used in the present invention.

FIG. 8 illustrates a modified example of the magnetic induction member 51 in which a pair of substantially comb-shaped magnetic plates 51a are combined together at their teeth of the "comb". A non-magnetic material 51b fills a substantially serpentine space defined between the comb teeth, so that the teeth of the comb-shaped plates 51a define the magnetic poles. FIG. 9 illustrates a further example of the magnetic induction member 55 which comprises a magnetic plate 55a and a plurality of magnetic poles 55b which are transversely extending parallel ridges projecting from the magnetic plate 55a. These arrangements of the magnetic induction member 51 or 55 can be equally used in place of the magnetic induction member 21 or 31.

Also, the linear motors as above described can be equally applied to the counter weight 5 alone or both of the elevator car 4 and the counter weight 5. In this context, the elevator car 4 and the counter weight 5 may be referred to as a movable body on which the linear motor may be mounted. Also, the present invention is also applicable to a ropeless linear motor elevator system, and the field magnet 26 or 38 may be a permanent magnet. The electromagnets of the field magnets 26 and 38 may be replaced with a permanent magnets. Further, the present invention is equally applicable to a elevator system having a one-sided linear motor or two-sided linear motor having the armature therebetween.

As has been described, the linear motor elevator system of the present invention comprises an elongated magnetic induction member installed within the hoistway. The elevator system also comprises a field magnet disposed on the movable body in a facing relationship with respect to the magnetic induction member for generating magnetic poles in the magnetic induction member. An armature is disposed on the movable body in a facing relationship with respect to the magnetic induction member so that a progressive magnetic field acting on the magnetic induction member is generated to generate a drive force for moving the movable member along the hoistway.

Alternatively, the linear motor elevator system of the present invention may comprise an elongated, rigid magnetic induction member extending along the hoistway and defining a guide surface for guiding the movable body therealong. A pair of field magnets are disposed on the movable body in a spaced, opposing relationship to each other for receiving the magnetic induction member therebetween, for generating magnetic poles in the magnetic induction member. Armatures are disposed on the field magnets in a facing relationship with respect to the magnetic induction member and generating progressive magnetic fields acting on the magnetic induction member to generate an electromagnetic drive force for moving the movable member along the hoistway. The movable body has mounted thereon a guide unit including a guide rollers which is in guided engagement with the guide surface on the magnetic induction element for guiding the movable body along the hoistway.

Accordingly, the linear motor elevator system of the present invention is simple in structure, easy to manufacture and install. The linear motor elevator system of the present invention is also inexpensive and has a linear motor improved in the power factor and the structure.

What is claimed is:

1. A linear motor elevator system comprising:
 a movable body disposed within a hoistway;
 an elongated magnetic induction member installed within the hoistway and extending along the hoistway;
 a field magnet disposed on said movable body in a facing relationship with respect to said magnetic induction member for generating magnetic poles in said magnetic induction member; and
 an armature disposed on said movable body in a facing relationship with respect to said magnetic induction member, said armature generating a progressive magnetic field acting on said magnetic induction member to generate a drive force for moving said movable member along said hoistway.

2. A linear motor elevator system as claimed in claim 1, wherein said movable body comprises at least one of an elevator car and a counter weight.

3. A linear motor elevator system as claimed in claim 1, wherein said magnetic induction member comprises an elongated magnetic plate extending along the hoistway and a plurality of magnetic poles disposed on said elongated plate at a substantially equal intervals along said hoistway, said magnetic poles facing toward said armature on said movable body.

4. A linear motor elevator system as claimed in claim 1, wherein said field magnet comprises an iron core having a substantially U-shaped cross section including a central web portion and parallel flange portions extending from said web portion, said flange portions extending toward said magnetic induction member, and a field winding disposed on said web portion of of said iron core.

5. A linear motor elevator system as claimed in claim 1, wherein said armature comprises a magnetic iron core having a plurality of teeth arranged along said magnetic induction member and a plurality of armature windings wound on said teeth.

6. A linear motor elevator system as claimed in claim 1, wherein said induction member comprises an elongated plate extending along the hoistway and a plurality of magnetic poles disposed on said elongated plate and facing toward said armature on said movable body;
 said field magnet comprises an iron core having a substantially U-shaped cross section including a central web portion and parallel flange portions extending from said web portion, said flange portions extending toward said magnetic induction member, and a field winding disposed on said web portion of of said iron core; and
 said armature comprises a plurality of teeth of said iron core arranged on said flange portions and extending toward said magnetic induction member and a plurality of armature windings wound on said teeth.

7. A linear motor elevator system as claimed in claim 3, wherein said magnetic poles of said magnetic induction member are positioned at equal intervals in a row on each side of said elongated magnetic plate, said magnetic poles in one row are in a staggered relationship relative to the magnetic poles in another row.

8. A linear motor elevator system as claimed in claim 3, wherein said magnetic plate comprises a pair of substantially comb-shaped plates combined together at their teeth of the comb and a non-magnetic material filling a serpentine space defined between said comb, said teeth of said comb-shaped plates defining said magnetic poles.

9. A linear motor elevator system as claimed in claim 3, wherein said magnetic poles of said magnetic induction member are transversely extending parallel ridges projecting from said magnetic plate.

10. A linear motor elevator system comprising:
 a movable body disposed within a hoistway;
 an elongated, rigid magnetic induction member installed within the hoistway and extending along the hoistway, said magnetic induction member defining a guide surface for guiding said movable body therealong;
 a pair of field magnets disposed on said movable body in a spaced, opposing relationship to each other for receiving said magnetic induction member therebetween, said field magnets being in a facing relationship with respect to said magnetic induction member from both side thereof for generating magnetic poles in said magnetic induction member;
 armatures disposed on said field magnets in a facing relationship with respect to said magnetic induction member, said armatures generating progressive magnetic fields acting on said magnetic induction member to generate an electromagnetic drive force for moving said movable member along said hoistway; and
 guide means mounted to said movable body and in guided engagement with said guide surface on said magnetic induction element for guiding said movable body along said hoistway.

11. A linear motor elevator system as claimed in claim 11, wherein said movable body comprises at least one of an elevator car and a counter weight.

12. A linear motor elevator system as claimed in claim 10, wherein said magnetic induction member comprises a rigid elongated magnetic plate extending along the hoistway and a plurality of magnetic pole pieces disposed on both side of said magnetic plate at a substantially equal intervals along said hoistway, said magnetic poles facing toward said armatures on said movable body.

13. A linear motor elevator system as claimed in claim 10, wherein each of said field magnets comprises an iron core having a substantially U-shaped cross section including a central web portion and parallel flange portions extending from said web portion toward said magnetic induction member, and a field winding disposed on said web portion of of said iron core.

14. A linear motor elevator system as claimed in claim 10, wherein each of said armatures comprises a magnetic iron core having a plurality of teeth arranged along said magnetic induction member and a plurality of armature windings wound on said teeth of said magnetic iron core.

15. A linear motor elevator system as claimed in claim 10, wherein said guide means comprises a plurality of guide rollers mounted to said movable body.

* * * * *

UNITED STATES PATENT AND TRADEMARK OFFICE
CERTIFICATE OF CORRECTION

PATENT NO. : 5,141,082

DATED : August 25, 1992

INVENTOR(S) : Ishii et al.

It is certified that error appears in the above-identified patent and that said Letters Patent is hereby corrected as shown below:

Title page,
item [73], Assignee, was omitted from the patent,
--Mitsubishi Denki Kabushiki Kaisha--.

Title page, item [57], Abstract, line 1, change "elevation" to --elevator--.

Signed and Sealed this

Ninth Day of November, 1993

Attest:

BRUCE LEHMAN

*Attesting Officer*         *Commissioner of Patents and Trademarks*